Sept. 29, 1931. L. SEGUIN ET AL 1,825,097
CONSTRUCTION OF INTERNAL COMBUSTION ENGINES
Filed Feb. 12, 1929
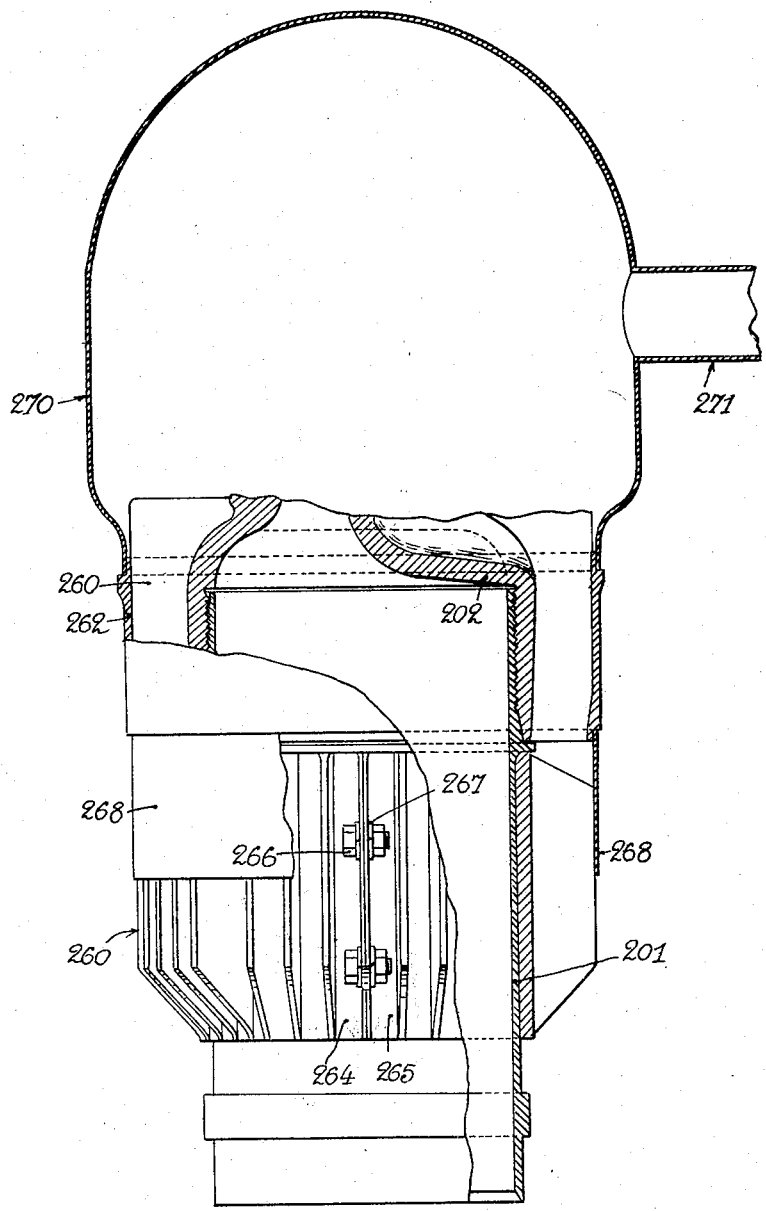
Laurent Seguin
Augustin Seguin
INVENTORS
By [signature]
Their Attorney Patented Sept. 29, 1931

1,825,097

UNITED STATES PATENT OFFICE

LAURENT SEGUIN AND AUGUSTIN SEGUIN, OF PARIS, FRANCE

CONSTRUCTION OF INTERNAL COMBUSTION ENGINES

Application filed February 12, 1929, Serial No. 339,460, and in France February 28, 1928.

The present invention relates to improvements in the construction of internal combustion engines, and chiefly in engines for flying machines.

The invention has for its object an improved arrangement for cooling the outer parts of the cylinder and cylinder head, by means of a current of air which is guided along cooling flanges or ribs.

Further characteristics of the invention will be specified in the following description, with reference to the appended drawing, which shows by way of example a preferred embodiment of the invention.

Referring to the drawing, 201 denotes anyone of the cylinders, which is preferably made of cast iron. Upon said cylinder is mounted the cylinder head 202 made of a light and heat-conducting metal and secured, for instance by screwing, to the upper end of said cast iron cylinder.

In our improved construction, the cylinder head has a set of longitudinal flanges or ribs 260, connected together at the periphery by a ring 262, cast in one therewith; said ring, together with flanges 260 and the outer surface of the cylinder head, form a certain number of longitudinal channels through which cooling air is circulated.

The main body of the cylinder is provided with two half-sockets 264—265 made of a light and heat conducting metal, and having cooling flanges or ribs, situated in line with flanges 260, which members 264—265 are assembled by bolts 266; elastic washers 267 are inserted between the bolts and the half-sockets, whereby the latter will be strongly pressed upon the cylinder body while providing for expansion. Upon the flanges of said members is shifted a sheet metal cover 268 forming an extension of ring 262.

To secure the air circulation through said longitudinal channels, the cylinder head is covered with a cap or hood 270 of stamped sheet metal, which is fitted upon the upper part of ring 262 and of the cooling flanges, said hood being connected by a lateral conduit 271 with a fan or a compressor.

This arrangement provides for a very energetic cooling of the outer parts of the cylinder head and of the valve box.

Obviously, the invention is not limited to the details of construction herein described and represented.

Having now described our invention what we claim as new and desire to secure by Letters Patent is:

1. In an internal combustion engine with air cooled cylinders, a cylinder, a longitudinally sectioned socket adapted to fit on said cylinder below the cylinder head and having integral cooling flanges and means for yieldingly pressing said socket on said cylinder.

2. In an internal combustion engine as claimed in claim 1, a sheet metal cover adapted to be fitted over the cooling flanges of said socket and means for circulating cooling air within said cover.

3. In an internal combustion engine as claimed in claim 1, a sheet metal cover adapted to be fitted over the cooling flanges of said socket, a sheet metal hood covering said cylinder head and merging with said cover, and means for forcing cooling air into said hood.

4. In an internal combustion engine with air cooled cylinders, a cylinder, a longitudinally sectioned socket adapted to fit on said cylinder below the cylinder head and having longitudinal integral cooling flanges and means for yieldingly pressing said socket on said cylinder.

In testimony whereof we have signed our names to this specification.

LAURENT SEGUIN.
AUGUSTIN SEGUIN.